United States Patent [19]
Schawinsky et al.

[11] 4,016,380
[45] Apr. 5, 1977

[54] TURN SIGNAL AND HAZARD WARNING CONTROL APPARATUS FOR UNITARY INSERTION INTO VEHICLE STEERING COLUMN BODY

[75] Inventors: Terry Kyle Schawinsky, South Lyon; Walter Strobl, Brighton; Melvin William Polkinghorn, Livonia, all of Mich.

[73] Assignee: International Telephone and Telegraph Corporation, New York, N.Y.

[22] Filed: Aug. 21, 1975

[21] Appl. No.: 606,556

[52] U.S. Cl. .......................... 200/61.27; 200/61.54
[51] Int. Cl.² ..................... H01H 3/16; H01H 9/00
[58] Field of Search ................... 200/61.27–61.38, 200/19 R, 61.54–61.57, 293–296

[56] References Cited
UNITED STATES PATENTS

| | | | |
|---|---|---|---|
| 3,710,049 | 1/1973 | Burgess et al. | 200/61.27 |
| 3,746,805 | 7/1973 | Stellwagen | 200/19 R |
| 3,914,566 | 10/1975 | Wendling | 200/61.27 |

Primary Examiner—James R. Scott
Attorney, Agent, or Firm—J. B. Raden; M. M. Chaban

[57] ABSTRACT

A turn signal mechanism which is configured in a pie-shaped modular segment adapted to mount into the steering column of an automotive vehicle from one side thereof. The mechanism may be removed radially from the steering column for replacement or repair without the necessity for removing other steering column components. All the operative components are mounted in a modular housing which is affixed on one side of the steering shaft and requires no disruption of the shaft for removal and replacement of the module.

5 Claims, 12 Drawing Figures

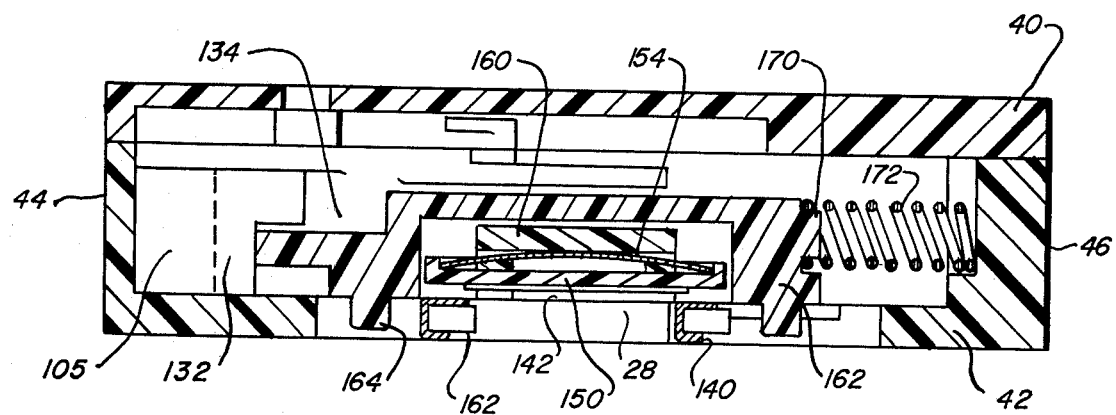
FIG. 3
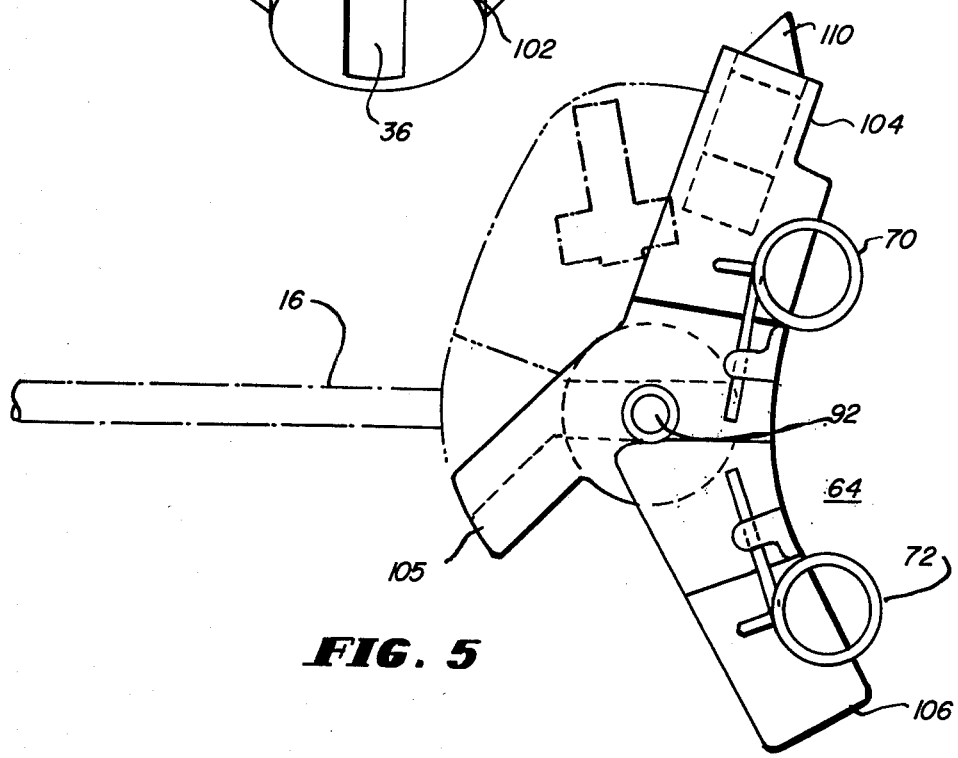
FIG. 4
FIG. 5

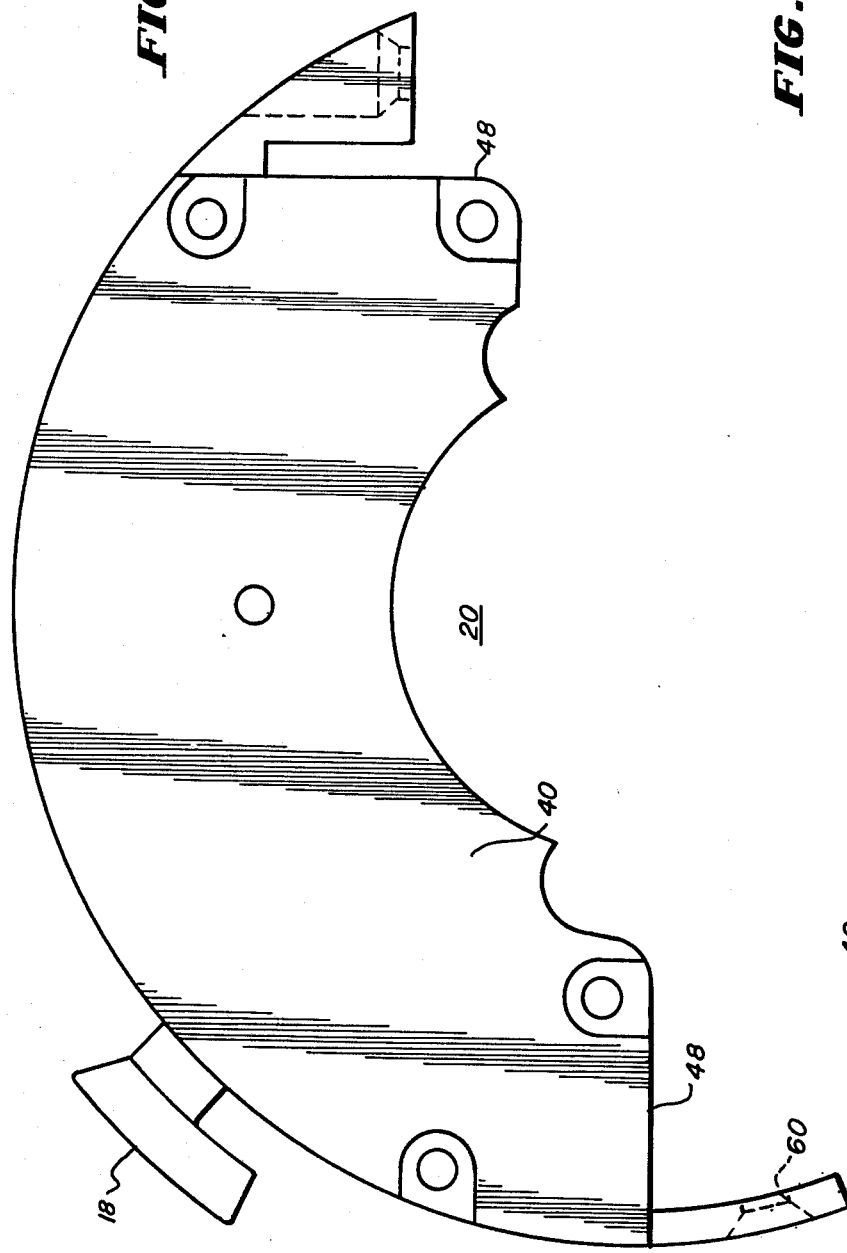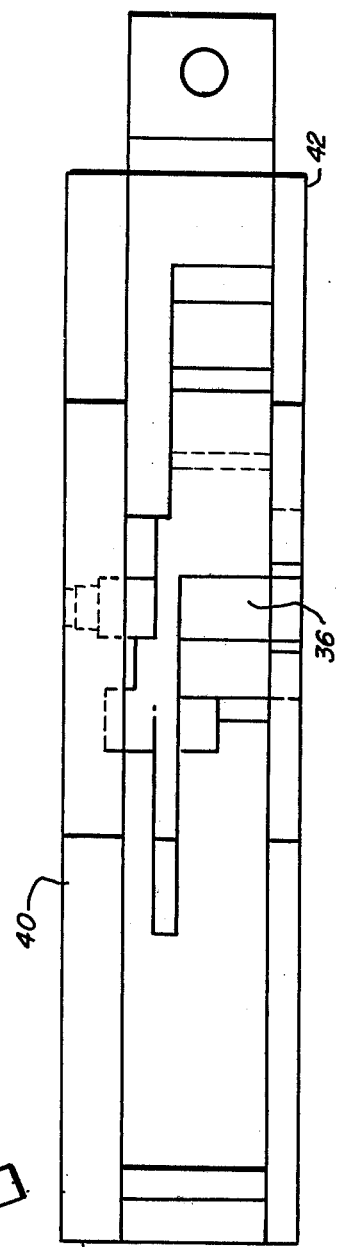

TURN SIGNAL AND HAZARD WARNING CONTROL APPARATUS FOR UNITARY INSERTION INTO VEHICLE STEERING COLUMN BODY

BACKGROUND OF THE INVENTION

The present invention is an improvement over the turn and hazard signal mechanism shown by U.S. Pat. No. 3,710,049 issued Jan. 9, 1973. This patent discloses a combined turn and hazard signal mechanism for vehicles. The mechanism housing is annular in shape for mounting axially over a steering shaft. Removal of the mechanism for replacement and repair requires removal of the steering wheel and mechanisms appurtenant to the column for removal of the housing annules. Clearly removal of mechanism is a complex costly and time-consuming chore as is replacement of the unit.

SUMMARY OF THE INVENTION

It is therefore an object of the invention to provide a modular hazard and turn signal mechanism which is adapted to mount to a steering column for removal and replacement in a direction radial to the steering column.

It is a further object of the invention to provide a unitary hazard and turn signal mechanism which is adapted to mount on the steering column of a vehicle, the mechanism covering less than 180° of arc of the steering cloumn.

It is another object of the invention to provide a modular turn and hazard warning signal within a modular cartridge mechanism for ready mounting and removal of the cartridge to a vehicle steering column.

To produce these and other objects, the invention employs a unitary mounting structure which fits into and mates with a segment of an enlarged steering column casing. The casing has a cutout extending over less than 180° of its arc and extending axially for a short distance adjacent the turn signal handle.

The combined turn signal and hazard warning switch of the present inventon is assembled into a laminar module, the module being adapted to be secured radially into an opening on the side of the steering column adjacent the turn signal handle.

BRIEF DESCRIPTION OF THE DRAWINGS

FIG. 3 is a sectional view taken along line 3—3 of FIG. 2;

FIG. 4 is a perspective view of the switch actuator mechanism viewed from the top thereof;

FIG. 5 is a plan view of the actuator of FIG. 4;

FIG. 7 is a plan view of modular mechanism of FIG. 2 detached from the steering column;

FIG. 8 is a side view of the modular mechanism of FIG. 7;

DETAILED DESCRIPTION OF THE DRAWINGS

Figure 1:
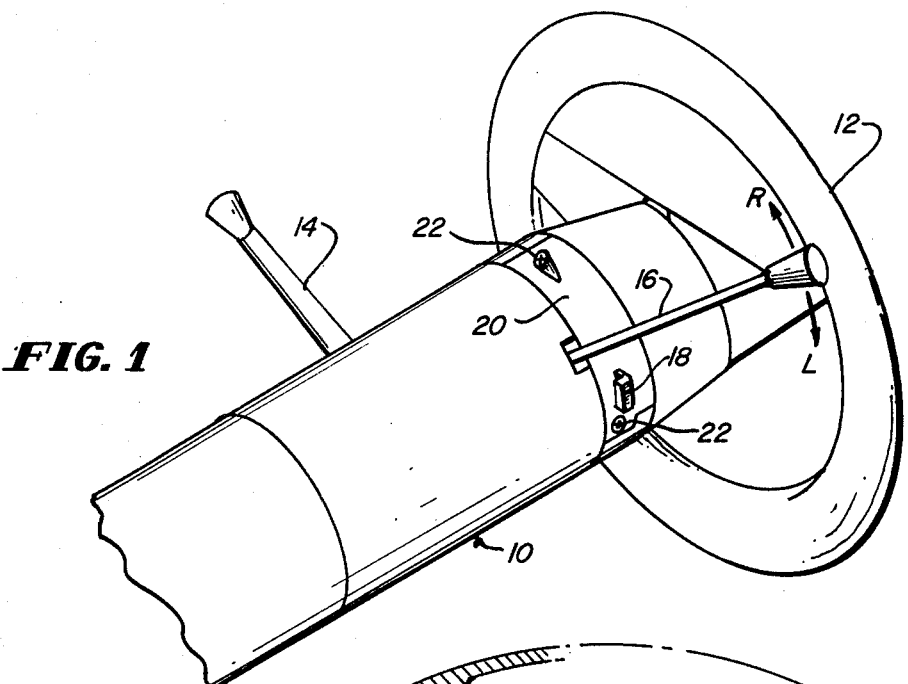
Fig. 1 is a partial perspective view of a vehicle steering wheel employing our invention.

In FIG. 1, I show a vehicle steering column 10 terminating at its outer end in the conventional vehicle steering wheel 12. A gear shift lever 14 extends into one side of the column and is connected to suitable mechanism, this area being outside the scope of the present invention.

A turn signal handle 16 of a conventional type protrudes from a side of the column, the handle being manually operable in a plane between three positions indicating left turn, normal and right turn. A hazard warning handle 18 is movable radially in a known manner to flash both the left turn and right turn lamps of the vehicle in response to radially outward movement of the handle 18.

As is well-known, the vehicle operator moves the handle from the normal position to either of the turn positions being embarking on such a turn. Mechanism is provided to return the handle to the normal or inoperative position automatically on restoration of the steering column, as described in U.S. Pat. No. 3,710,049 issued Jan. 9,1973 to the common assignee of the present invention. Also shown in the cited patent is a mechanism for operating the hazard warning in a generally similar manner.

In that patent, there is shown a switching apparatus for performing the same output functions as the present invention, the structure of the present mechanism 20 to effect these functions being different than that shown by the patent.

The switching mechanism 20 which forms the present invention is a modular or cartridge element insertable into a suitably sized slot in the steering column adjacent the turn signal handle 16 to be cooperative therewith as will be explained further.

Figure 2:
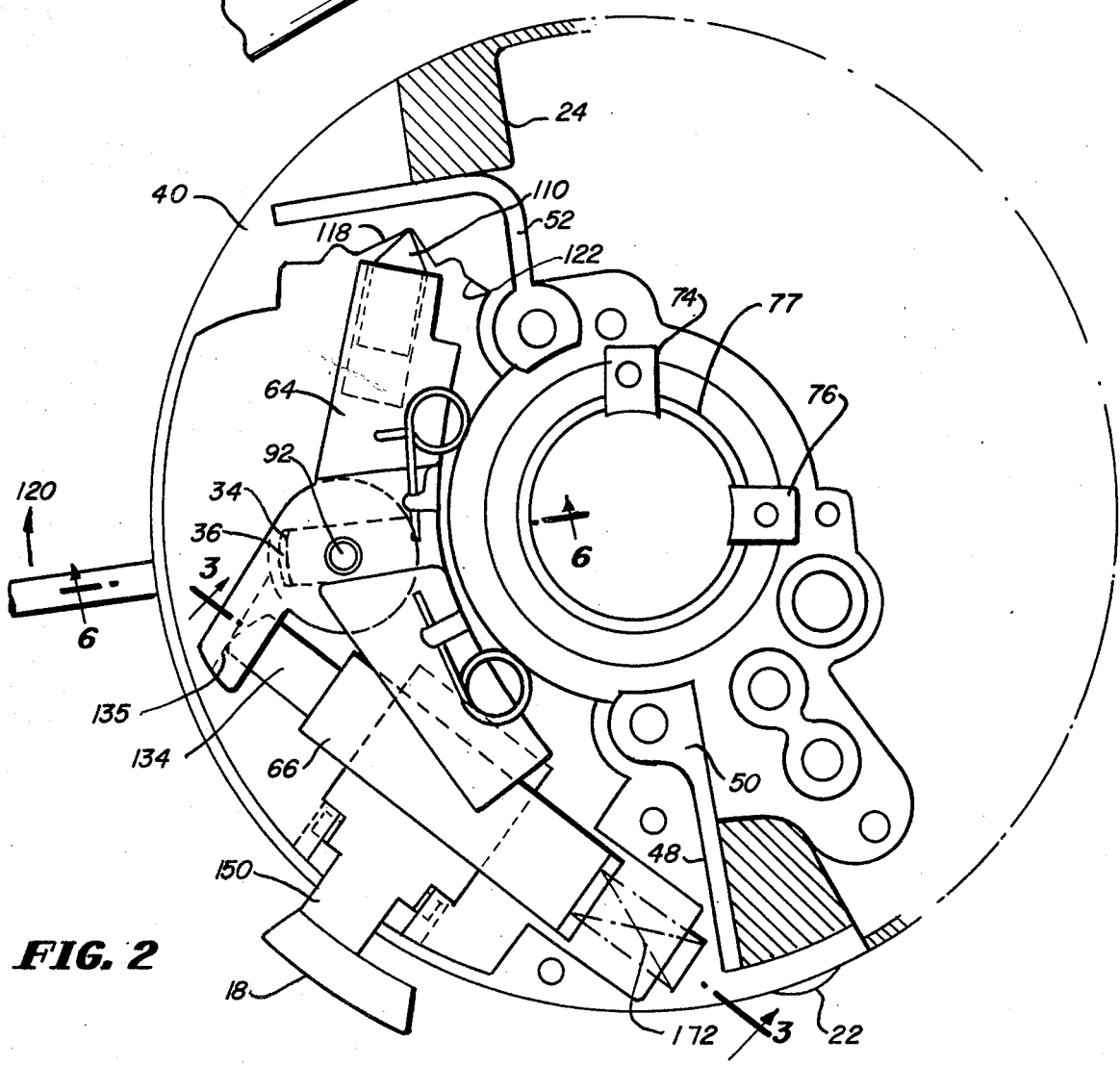
FIG. 2 is a plan view of the mechanism of FIG. 1; installed in the steering column, the view being partially broken away to show the interior thereof.
Figure 9:
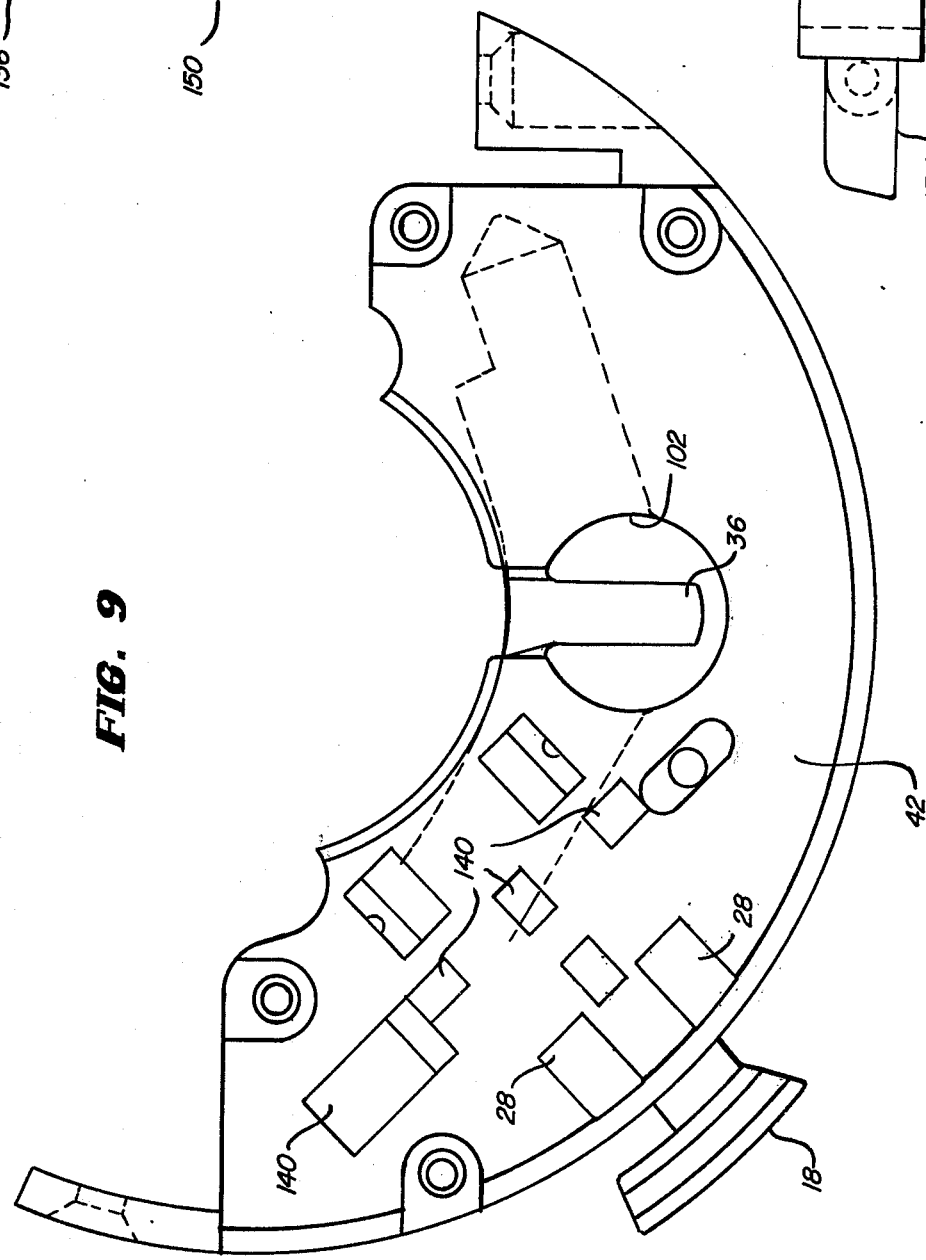
FIG. 9 is a bottom view of the mechanism of FIG. 8.

The mechanism 20 as shown in FIGS. 2, 7 and 9 is essentially pie-shaped comprising a cylindrical sector of the steering column comprising 180° or less of arc of the column. The mechanism 20 is modular in that it comprises a flat, unitary assembly which is insertable into the previously mentioned slot in the steering column and may be mounted thereon by means of two screws 22 which engage suitable tapped openings in the steering column wall 24.

On removal of these two screws, the mechanism 20 may be withdrawn in a radially outward movement from the steering column for repair and/or replacement. It should be noted that the electrical connections from the mechanism to the conductors leading to the signal lamps are by way of sliding contacts 28 shown in FIG. 9 engaging similarly located contacts in the stationary portion of the steering column. In this way, no wires remain to be disconnected to permit removal and replacement of mechanism 20.

It should also be noted that the connection of the turn signal handle 16 to the mechanism 20 is effected by having the handle 16 plug or screw into a rotatable handle receiving member 62. Member 62 terminates in a flat walled key member which engages a flat walled slot 36 in the mechanism 20. The slot 36 has its radially inward extent open to allow the mechanism to be moved radially outwardly to free its engagement with the turn signal handle receiver on radially directed removal of the mechanism 20 from the steering column.

The mechanism 20 is defined by a top, electrically insulating plate 40 shown in FIGS. 2, 3 and 7–9, a generally similar bottom plate 42 which may include integral side walls 44 and 46 to complete the modular, generally enclosed electrically insulating assembly. As seen best in FIGS. 7 and 9, the mechanism encompasses less than 180° of arch of the steering column to allow the insertion and removal as a unit.

Turning now to FIG. 2 and the mechanism 20 in greater detail, the receiving portion of the steering column is defined by brackets 50 and 52 inset in the column and providing guide surfaces for the ready entry and alignment of the mechanism 20 by way of mechanism guide surfaces which position the mechanism 20 relative to the operative elements which with it must cooperate, such as suitable stationary electrical contacts which mate with contacts 28.

The mechanism 20 of the present invention is inserted into the steering column opening and mounted against stationary brackets 50 and 52. These brackets are permanently secured in the steering column cavity and extend outwardly of the inner steering tube 54 of the column 10 but terminate inwardly of the column periphery. The mechanism 20 is secured by bolts or screws 22 at the opposite ends of the mechanism placed in openings 60 (FIG. 7) both openings 60 being shown as chamfered, the screws engaging suitable receivers in the column structure.

Figure 6A:
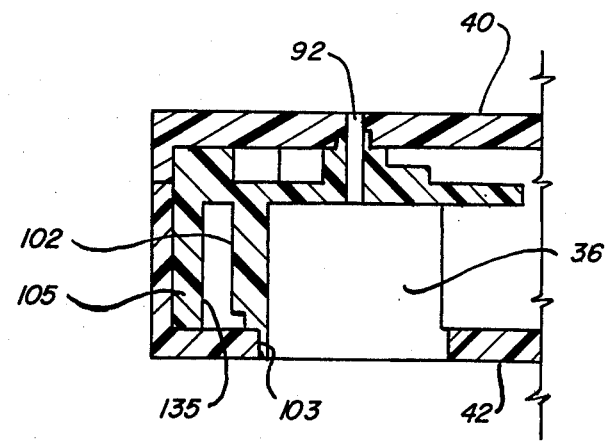
FIG. 6A is a sectional view taken along line 6—6 of FIG. 2.
Figure 6B:
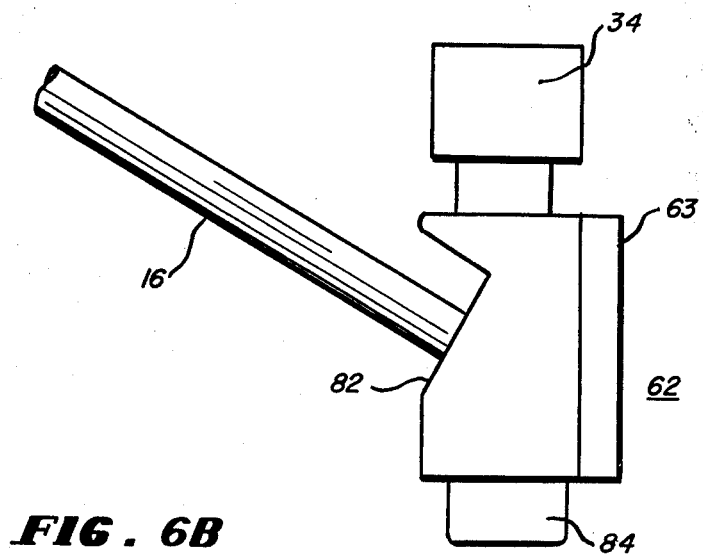
FIG. 6B is a side view in elevation of the turn handle mounting member as used herein.

The mechanism 20 has as its sub-assemblies, the turn handle receiver or turn post 62 shown in detail in FIGS. 6A and 6B, the cam actuator 64 operated by the turn handle (shown in detail in FIGS. 4 and 5 herein) and the switch member 66 including contacts and a switch operator. The switch member 66 is generally similar to that shown in the cited U.S. Pat. No. 3,710,049 in that a bridging switch contactor is translated radially for hazard signalling and translated tangentially for turn signal operation, the two translatory motions being at right angles to one another. Restoration of the turn signal operation is effected by the interaction of the torsion springs 70 and 72 with bosses 74 and 76 of a surface 77 of the steering column inner member in a manner similar to that of the previously cited reference patent.

The handle receiver 62 or turn post is shown in detail in FIGS. 6A and 6B. This receiver is not an integral part of the mechanism but is joined to it by a slidably removable engagement. When the mechanism 20 is removed for the steering column, the turn post remains in the assembly. The turn handle 16 plugs into a suitable opening in the turn post midsection 80, the opening 80 being in the inclined surface 82, th surface and opening inclining the handle 16 at an acute angle relative to the mechanism 20.

The turn post has a cylindrical pivotal member 84 at its bottom end, the member 84 resting with a socket (not shown) in a known manner. Above the central body section 63, the post terminates in a rectangular key section 34 which protrudes into slot 36 in actuator 64 (see FIGS. 4 and 5). The key in slot engagement causes actuator 64 to pivot in response to movement of the turn handle. When the turn handle is moved in the direction of arrows L or R in FIG. 1, the receiver 62 rotates about its pivotal member 84 to rotate the key about its rotational axis indicated by numeral 92 in FIG. 2 or FIG. 5.

The actuator 64 is essentially Y-shaped with a central pivotal section 102 including key receiving slot 90. Section 102 is cylindrical and rests in a circular opening 103 in bottom plate 42 (see FIG. 6A). The three arms 104, 105 and 106 of the actuator are in a plane essentially normal to the mounting section 102, so that movement of the turn handle causes rotary movement of actuator arms 104, 105 and 106 about the axis 92.

One arm 104 has a conic nose 110 protruding from the end of the arm, the nose being fitted in a suitable recess 112 and biased outwardly by compression spring 114. The apex 116 of nose 110 normally rests in a stationary receiving socket 118 so that on movement of the turn handle 16 in the direction of arrow 120 in FIG. 2, the nose is depressed against the action of spring 114 ad the arm 104 is rotated to place the apex in declivity 122.

A cam arm 105 is disposed away for the steering tube 54 at an obtuse angle to arm 104 within the essentially common plane. This arm is positioned adjacent the switch operator 134 (FIG. 2) and has an inverted L-shaped wall 130 with a cam surface engaging the end 132 of operator 134.

The other arm 106 of actuator 64 extends about the steering tube 54 and acts as a holder for one of the restoring torsion springs 72.

The turn signal switch operator 134 is a complex shaped member shown in detail in FIGS. 2 and 3, and is moved linearly responsive to rotational motion of the cam actuator. The operator 134 has a central span 135 lying parallel to contact spring holder 136 and straddle legs 138 on both lateral sides of the contact holder 136. These straddle legs are moved on movement of the operator to move the holder 136 and its contact springs in a manner known in the art.

The switch assembly includes stationary contacts 140 on the base of the bottom plate 42 (see FIG. 9), these contacts in a known manner extending on both sides of plate 42 by passage through suitable slots in plate 42.

The hazard warning handle 18 has a switch operator 146 integral thereto. This operator 146 is similar in shape to operator 134 in that it has a central span 147 parallel to and between operator 134 and contact holder 136. Hazard operator 146 has front and back straddle legs (only back legs 137 being shown in FIG. 3) to carry the contact holder responsive to movement of the hazard handle.

When the mechanism 20 is mounted in the steering column, the bottom contacts 140 mate with stationary terminals in the steering column to complete paths from the switch. These terminals may be spring loaded for contact with the switch mechanism contacts. Within the assembly, the upper extent 142 of these individual contacts 140 rest along the upper surface of insulating plate 42 and are contacted by the movable suitable bridging wiper 150 which is mounted on insulating contactor holder 136. Wiper 150 may include three dimpled contact element suitably positioned, the contact elements being joined by a lateral body section, the body section and the contact elements comprising a single, intergral member. The wiper is fabricated of suitable spring contact material so that the contacts may be tensioned against the wiper to provide contact between movalbe and stationary contacts. Wipers 150 close paths between the stationary contacts to complete either one or both paths between left side lamp contacts and right side lamp contacts or both, as the wiper holder 152 is moved to the left, the right or in a plane into and out of the paper in FIG. 3. A bow spring 154 is captured in grooves on the holder and rests against hazard operator 146 to bias the holder down toward the contacts.

Straddling the contact holder 136 are both the turn signal operator 134 and the hazard operator 146 with their straddle legs resting on all sides of the backstop. The straddle legs 162 of the turn signal operator 134 terminate in dowel members 164 resting in longitudinal slots to constrain the operator to a translatory movement.

At its remote end, the turn signal operator 134 has a wall with an abutment 170 bearing one end of compression spring 172 against the sidewall 46 of the assembly. Thus, in its normal position the spring biases the operator 134 to the left as viewed in FIGS. 2 and 3.

In operation, the turn signal handle may be turned to the right or left signifying turns, and the signal automatically restores. The hazard may be pulled outwardly for operation in a flashing manner of both turn signal lamps.

Viewing the machanism of FIG. 2, when the turn signal handle is moved in the direction of arrow 120, the handle key 34 of the turn post is rotated about axis 92. Cam actuator 64 is moved upwardly (as shown in FIG. 2) and the nose cone 110 is depressed against the bias of spring 114. The nose cone is rotated and enters declivity 122.

Figure 10:
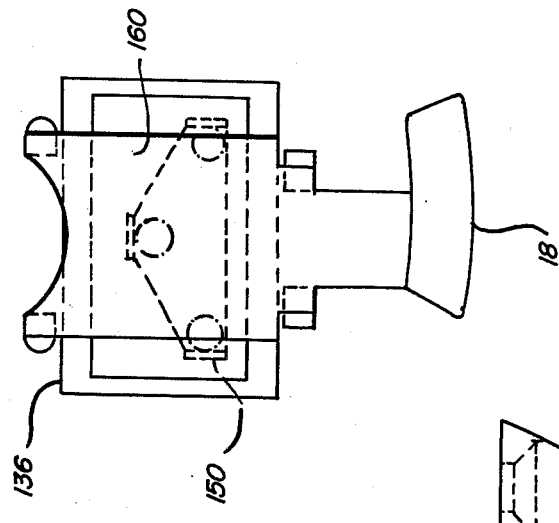
FIG. 10 is a plan view of the hazard switch operator and contact apparatus.
Figure 11:
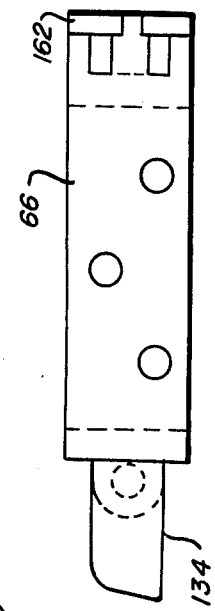
FIG. 11 is a plan view of the turn signal switch operator as used herein.

By the movement of actuator 64 in this direction, cam wall 130 is moved away form the adjacent wall of turn switch operator 134. Operator 134 moves under the bias of spring 172 to translatorily move the operator upwardly and to the left (in FIG. 2). The turn switch operator straddle legs move the spring holder accordingly across the contacts to place only the left contact of FIG. 10 in engagement with the bridging wiper to the power source. Spring 172 holds the mechanism in this position until the switch is released by counter acting force engineered by either manual restoration of the turn handle or by restoring movement of the steering column acting through boss 74 on torsion spring 70.

On movement of the turn signal handle in the counter-clockwise direction (in FIG. 2), the key 34 rotates the slot 36 and the turn post accordingly to move actuator 64. The cam surface 130 of the actuator pushes against the end 132 of the turn switch operator to translate the operator 134 and depress spring 172. The movement of the operator carries the spring holder and closes the other stationary contact to the power source common. The nose cone enters the other notch 123 to hold the switch in this condition until restored manually or by column movement.

The hazard warning is operated by pulling outwardly on the hazard handle (down in FIG. 10) and pulling the spring holder to place both lamp contacts into engagement with the common source.

A number of variations are possible using the principle shown for heavy current systems, for adding cornering lights or for adding other switches. For example, to provide high current switching, the leaf springs on the holder block would be replaced by heavier metal slugs to increase the current-carrying capability of the spring contacts. To add features such as cornering lights, added cam surfaces such as surface 180 of FIG. 5 could be provided. Switch mechanisms responsive to movement of cam 180 would then be employed to switch vehicle cornering lamps.

I claim:

1. A combined turn signal and hazard warning mechanism adapted for insertion into the body of the steering column of a vehicle to mate with a turn lever assembly for joint pivoting therewith, said mechanism comprising a segmental walled member includng a plurality of electrical contacts and a common contact operating member operative in one direction responsive to pivotal movement of a turn signal handle of said assembly to open and close certain of said contacts and operative in another direction responsive to slide movement of a harzard warning handle to open and close certain other of said contacts, said hazard warning handle and said turn signal handle being axially spaced about said column in one quadrant thereof and in separate planes along the height of said column, means for translating the pivotal movement of said lever into reciprocal slide movement of said contact operating member, said translating means including a driving member constrained to pivotal movement, and a driven member constrained to sliding movement, an arm of said driving member engaging said driven member to slide said driven member in a first direction, a restoring spring responsive to pivotal movement of said lever in a reverse direction for sliding said driven member in the direction opposite said first direction to either a restored position with said contacts open or to an opposite position with certain of said contacts operated dependent on the position of said turn handle and said driving member.

2. A combined mechanism as claimed in claim 1, wherein said driving member comprises a Y shaped member having said first arm, engaging said driven member, a second of said arms including a detent for holding said mechanism in a turn signal contact operating position.

3. A combined mechanism as claimed in claim 2, wherein said second arm and a third arm are positioned to restore said driving member, said turn signal handle and said contact operating member on movement of a steering post of said steering column.

4. A combined turn signal and hazard warning mechanism for the steering column of a vehicle, said mechanism adapted to be actuated in a first manner by a turn signal handle external to said mechanism and to be actuated in a second manner by a hazard warning handle angularly spaced from said turn signal handle with said turn signal handle affixed within said mechanism, said mechanism including a switch actuator mechanism responsive to movement of said turn signal handle and to turn signal restoring members, a switch assembly including a plurality of electrical contacts, an operator engaged by said actuator and by said turn handle to open and close specific contacts of said switch assembly, said actuator including a pivotal hub for engaging said turn handle in a responsive manner, an actuator for engaging said operator, a detent member for holding a position of said switch assembly once set, and means for mounting said assembly in said column by unitary insertion.

5. A mechanism as claimed in claim 4, in which said operator includes means biasing said operator for operation of said switch assembly on release of said detent from a set position.

* * * * *